United States Patent
Yoon et al.

(10) Patent No.: US 11,730,993 B2
(45) Date of Patent: Aug. 22, 2023

(54) EXTINGUISHING COMPOSITION, METHOD FOR PREPARING THE SAME, SECONDARY BATTERY AND BATTERY PACK

(71) Applicants: LG CHEM, LTD., Seoul (KR); KONKUK UNIVERSITY INDUSTRIAL COOPERATION CORP, Seoul (KR)

(72) Inventors: Yeo Min Yoon, Daejeon (KR); Ji Hyun Choi, Daejeon (KR); Bum Young Jung, Daejeon (KR); Jeong Ho Ha, Daejeon (KR); Ki Jae Kim, Seoul (KR); Yong Keon Ahn, Seoul (KR); Kyu Bin Lee, Seoul (KR); Yustian Suharto, Seoul (KR)

(73) Assignees: LG ENERGY SOLUTION, LTD., Seoul (KR); KONKUK UNIVERSITY INDUSTRIAL COOPERATION CORP, Seoul (KR)

( * ) Notice: Subject to any disclaimer, the term of this patent is extended or adjusted under 35 U.S.C. 154(b) by 307 days.

(21) Appl. No.: 17/049,483

(22) PCT Filed: Dec. 24, 2019

(86) PCT No.: PCT/KR2019/018422
§ 371 (c)(1),
(2) Date: Oct. 21, 2020

(87) PCT Pub. No.: WO2020/149547
PCT Pub. Date: Jul. 23, 2020

(65) Prior Publication Data
US 2021/0260426 A1    Aug. 26, 2021

(30) Foreign Application Priority Data

Jan. 17, 2019    (KR) .................. 10-2019-0006144

(51) Int. Cl.
*A62D 1/00*    (2006.01)
*B01J 13/04*    (2006.01)
*H01M 10/42*    (2006.01)

(52) U.S. Cl.
CPC .......... *A62D 1/0021* (2013.01); *B01J 13/046* (2013.01); *H01M 10/4235* (2013.01)

(58) Field of Classification Search
CPC ....... A62D 1/0021; B01J 13/046; B01J 13/04; Y02E 60/10; H01M 10/4235; H01M 10/42; H01M 50/24
See application file for complete search history.

(56) References Cited

U.S. PATENT DOCUMENTS 4,102,794 A   7/1978   Gandini et al.
5,149,735 A   9/1992   Bressan et al.
(Continued)

FOREIGN PATENT DOCUMENTS

CN    1229399 A    9/1999
CN    103170085 A    6/2013
(Continued)

OTHER PUBLICATIONS

English Translation of JPS63217196A (Year: 1988).*
(Continued)

*Primary Examiner* — Andrew J. Oyer
(74) *Attorney, Agent, or Firm* — Birch, Stewart, Kolasch & Birch, LLP

(57) ABSTRACT

The present invention relates to an extinguishing composition and comprises an extinguishing material and a capsule containing the extinguishing material, and the extinguishing material comprises calcium bromide ($CaBr_2$).

13 Claims, 16 Drawing Sheets

(56) References Cited

U.S. PATENT DOCUMENTS

| | | |
|---|---|---|
| 6,291,068 B1 | 9/2001 | Wang et al. |
| 8,857,651 B2 | 10/2014 | Stelzl |
| 2016/0257886 A1 | 9/2016 | Gangi |
| 2018/0331386 A1 | 11/2018 | Koh et al. |
| 2019/0267685 A1 | 8/2019 | Jeong et al. |

FOREIGN PATENT DOCUMENTS

| | | | |
|---|---|---|---|
| CN | 105742733 A | 7/2016 | |
| CN | 106785126 A | 5/2017 | |
| CN | 107376185 A | 11/2017 | |
| JP | 55-108366 A | 8/1980 | |
| JP | S63217196 A | * 9/1988 | |
| JP | 2000-7558 A | 1/2000 | |
| JP | 2011-72669 A | 4/2011 | |
| JP | 5374309 B2 | 12/2013 | |
| KR | 10-2011-0050136 A | 5/2011 | |
| KR | 10-2013-0045614 A | 5/2013 | |
| KR | 10-2015-0014888 A | 2/2015 | |
| KR | 10-2017-0046330 A | 5/2017 | |
| KR | 10-2018-0039834 A | 4/2018 | |
| KR | 10-2018-0047360 A | 5/2018 | |
| RU | 2014145602 A | 6/2016 | |
| WO | WO-2009128476 A1 | * 10/2009 | ............. B01J 13/04 |

OTHER PUBLICATIONS

English Translation of WO-2009128476 (Year: 2009).*
Extended European Search Report, dated Apr. 19, 2021, for European Application No. 19910315.1.
International Search Report for PCT/KR2019/018422 dated Apr. 10, 2020.

* cited by examiner

EXTINGUISHING COMPOSITION, METHOD FOR PREPARING THE SAME, SECONDARY BATTERY AND BATTERY PACK

CROSS-REFERENCE TO RELATED APPLICATION

The present application claims the benefit of the priority of Korean Patent Application No. 10-2019-0006144, filed on Jan. 17, 2019, which is hereby incorporated by reference in its entirety.

TECHNICAL FIELD

The present invention relates to an extinguishing composition, a method for preparing the same, a secondary battery and a battery pack, and more particularly, to an extinguishing composition, a method for preparing the same, a secondary battery, and a battery pack.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery comprises an electrode assembly, in which an electrode and a separator are alternately stacked, and a case accommodating the electrode assembly.

However, the secondary battery has a problem in that explosion or ignition occurs when high-temperature heat occurs due to overcharging, overcurrent, and physical external impacts.

DISCLOSURE OF THE INVENTION

Technical Problem

The present invention solves the above problems, and therefore, an object of the present invention is to provide an extinguishing composition comprising a capsule containing an extinguishing material that comprises calcium bromide ($CaBr_2$) to effectively suppress explosion or ignition by using an air blocking effect, a method for preparing the same, a secondary battery, and a battery pack.

Technical Solution

The present invention is to achieve the above object, and therefore, an extinguishing composition according to a first embodiment of the present invention comprises: an extinguishing material; and a capsule configured to contain the extinguishing material, wherein the extinguishing material comprises calcium bromide ($CaBr_2$).

The capsule may be made of a thermoplastic resin, and the thermoplastic resin may be composed of an acrylate monomer or an acrylate polymer.

The acrylate monomer may comprise a polymethyl methacrylate polymer.

The extinguishing composition may further comprise a dispersion layer applied to an outer circumferential surface of the capsule, wherein the dispersion layer may be made of a silicone oil material.

A method for preparing an extinguishing composition according to the first embodiment of the present invention comprises: mixing a thermoplastic resin with a solvent to prepare a capsule solution in which the thermoplastic resin is dissolved adding a plurality of extinguishing materials to the capsule solution to apply the capsule solution to surfaces of the plurality of extinguishing materials; and heating the plurality of extinguishing materials coated with the capsule solution to evaporate the solvent contained in the capsule solution so as to capsulate the thermoplastic resin remaining on the surfaces of the plurality of extinguishing materials, thereby preparing the extinguishing composition.

The plurality of extinguishing materials may use calcium bromide ($CaBr_2$).

The thermoplastic resin may use a polymethyl methacrylate polymer resin that is an acrylate polymer resin, and the solvent may use dichloromethane.

The method may further comprise stirring the capsule solution, to which the plurality of extinguishing materials are added, to adjust a size and shape of each of the extinguishing materials and a thickness and shape of the capsule solution applied to the extinguishing materials after adding a plurality of extinguishing materials to the capsule solution and before heating the plurality of extinguishing materials.

The method may further comprise applying a dispersion solution to the outside of the plurality of extinguishing materials coated with the capsule solution so that the plurality of extinguishing materials coated with the capsule solution are separated from each other after stirring the capsule solution and before heating the plurality of extinguishing materials.

The dispersion solution may be provided with silicone oil.

The method may further comprise, after heating the plurality of extinguishing materials, cleaning the extinguishing composition to remove the dispersion solution applied to the extinguishing composition.

A secondary battery according to a second embodiment of the present invention comprises: an electrode assembly in which a plurality of electrodes and a plurality of separators are alternately stacked; a case in which the electrode assembly is accommodated; an electrolyte stored in the case so as to be impregnated into the electrode assembly; and an extinguishing composition provided in at least one of the electrodes, the separators, or the electrolyte, wherein the extinguishing composition comprises an extinguishing material and a capsule containing the extinguishing material, and the extinguishing material comprises calcium bromide ($CaBr_2$).

When the extinguishing composition is provided on the separators, the extinguishing composition may be applied to surfaces of the separators through a polymer binder.

The extinguishing composition may be further provided outside the case.

A battery pack according to a third embodiment of the present invention comprises one or more secondary batteries, wherein each of the secondary batteries comprises: an electrode assembly in which a plurality of electrodes and a plurality of separators are alternately stacked; a case in which the electrode assembly is accommodated; an electrolyte stored in the case so as to be impregnated into the electrode assembly; and an extinguishing composition provided in at least one of the electrodes, the separators, or the electrolyte, wherein the extinguishing composition comprises an extinguishing material and a capsule containing the extinguishing material, and the extinguishing material comprises calcium bromide ($CaBr_2$).

Advantageous Effects

The extinguishing composition of the present invention may comprise the extinguishing material and the capsule.

The extinguishing material may comprises calcium bromide (CaBr2). Therefore, the high-temperature heat and the flame may be effectively suppressed by using the air blocking effect to prevent the explosion accidents.

Particularly, the extinguishing composition may be applied to the secondary battery. Therefore, the ignition and the explosion of the secondary battery may be effectively prevented to improve the safety of the secondary battery.

MODE FOR CARRYING OUT THE INVENTION

Figure 1:
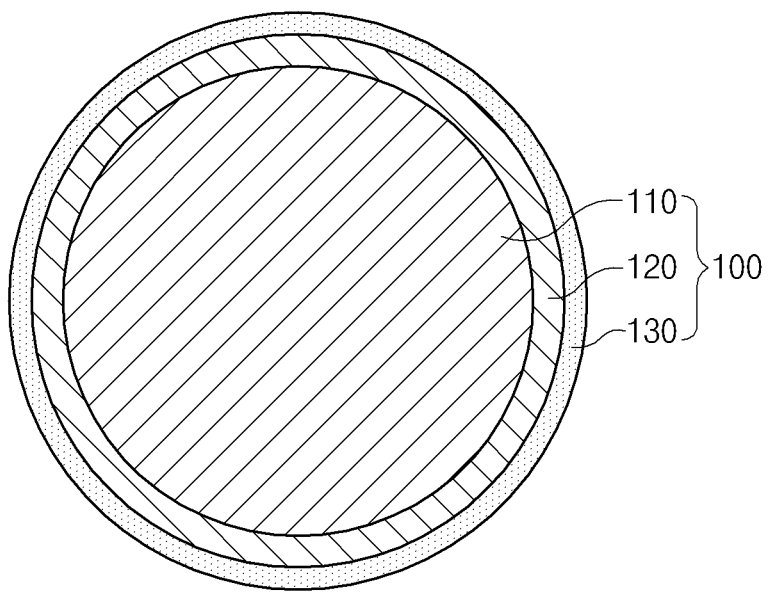
FIG. 1 is a cross-sectional view of an extinguishing composition according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Extinguishing Composition According to First Embodiment of the Present Invention]

As illustrated in FIG. 1, an extinguishing composition 100 according to a first embodiment of the present invention comprises an extinguishing material 110 and micro capsules 120 (hereinafter, referred to as capsules) containing the extinguishing material 110.

Extinguishing Material

The extinguishing material 110 has an extinguishing function of suppressing high-temperature heat and comprises calcium bromide (CaBr2).

The calcium bromide (CaBr2) is a compound of bromine (Br) and calcium (Ca), which suppresses flame diffusion through oxygen removal to suppress generation of high-temperature heat. Particularly, the bromine (Br) is used as an extinguishing agent that is a halogen compound.

Capsule

Each of the capsules 120 is configured to protect the extinguishing material from the outside at a predetermined temperature or less and is provided as a small shell made of a thermoplastic resin.

Here, the capsule 120 has not to exhibit an increase in resistance component and uses the thermoplastic resin having excellent chemical resistance and insulation with respect to an organic electrolyte.

For example, the thermoplastic resin is composed of an acrylate monomer or an acrylate polymer. The acrylate monomer or the acrylate polymer are lightweight, are not electrically conductive, do not rust or rot, are not well melted, have high strength, and are easily melted by heat. Particularly, the acrylate monomer and the acrylate polymer are excellent in hydrophobicity.

Also, a polymethyl methacrylate polymer is used as the acrylate polymer. The polymethyl methacrylate polymer among polymers has crystallinity and high transparency and also has hard properties as well as weather resistance, surface strength, chemical resistance, and electrical insulation. That is, the polymethyl methacrylate may be used to stably protect the extinguishing material.

In addition, a dispersion layer 130 that disperses the capsules 120 so as not to be attached is further provided outside the capsules 120.

Dispersion Layer

The dispersion layer 130 is applied to outer circumferential surfaces of the capsules 120 to allow the outer circumferential surfaces of the capsules 120 to be smooth, thereby removing an adhesive property of the capsules 120. As a result, the capsules do not adhere to each other but are dispersed.

In particular, the dispersion layer 130 is made of a silicone oil material. The silicone oil is an oil-like liquid without taste and odor and allows the outer circumferential surface of the capsules 120 to be smooth, thereby reducing friction and preventing the capsules 120 from being worn or melted to be attached together. That is, the dispersion layer 130 may more easily disperse the capsules 120 by using the silicone oil material.

The dispersion layer 130 may be removed from the extinguishing composition 100 when the extinguishing composition 100 is completed.

Thus, the extinguishing composition 100 according to the first embodiment of the present invention may comprise the extinguishing material 110 that is the calcium bromide (CaBr2) and the capsules 120. Therefore, an extinguishing composition having a new structure with a superior extinguishing function may be realized to effectively suppress the high-temperature heat and the flame.

Hereinafter, a method for preparing the extinguishing composition according to the first embodiment of the present invention will be described.

[Method for Preparing Extinguishing Composition According to First Embodiment of the Present Invention]

Figure 2:
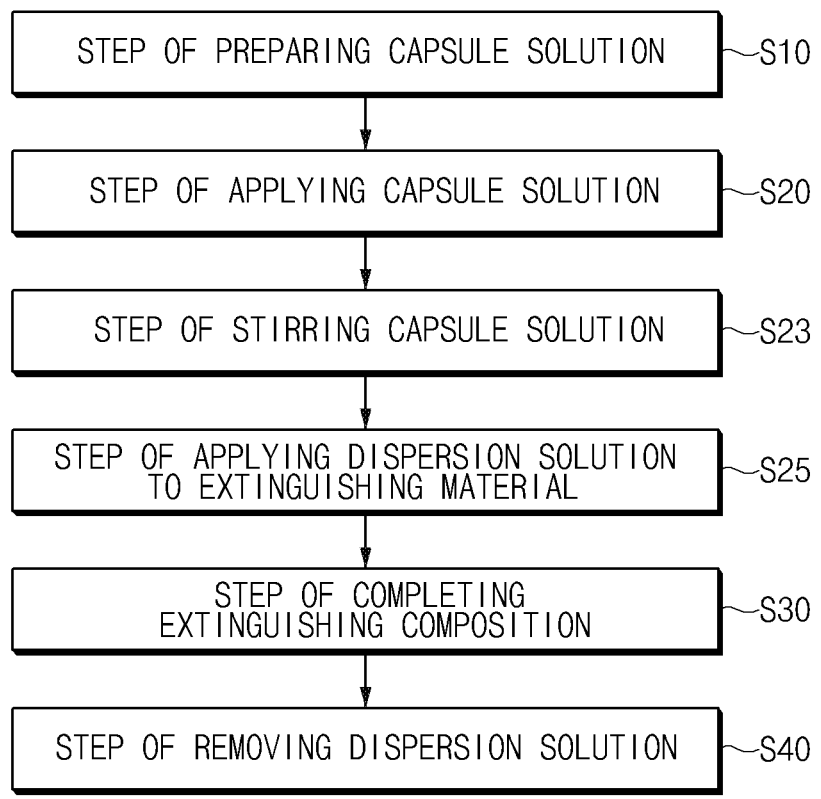
FIG. 2 is a flowchart illustrating a method for preparing the extinguishing composition according to the first embodiment of the present invention.

As illustrated in FIG. 2, a method for preparing the extinguishing composition according to the first embodiment of the present invention comprises a step (S10) of preparing a capsule solution, a step (S20) of applying the capsule solution, a step (S23) of stirring the capsule solution, a step (S25) of applying a dispersion solution, and a step (S30) of completing an extinguishing composition.

Step of Preparing Capsule Solution

In the step (S10) of preparing the capsule solution, a thermoplastic resin and a solvent are mixed to prepare a capsule solution in which the thermoplastic resin is dissolved.

Figure 3A:
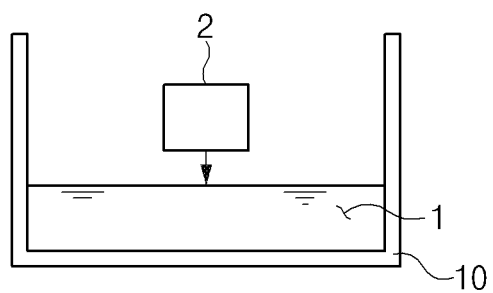
FIGS. 3a to 3f are process diagrams illustrating a process of preparing the extinguishing composition that is prepared by the method for preparing the extinguishing composition according to the first embodiment of the present invention.

For example, in the step (S10) of preparing the capsule solution, as illustrated in FIG. 3a, the thermoplastic resin 2 is put into a water tank 10 in which the solvent 1 is stored. Then, a solution is generated while the thermoplastic resin 2 is melted by the solvent 1, and a capsule solution 3 is prepared while the thermoplastic resin solution and the solvent are mixed with each other.

The thermoplastic resin 2 uses an acrylate polymer resin that is excellent in weather resistance, surface strength, chemical resistance, electrical insulation, and the acrylate polymer resin uses a polymethyl methacrylate polymer resin.

Also, the solvent 1 uses dichloromethane to easily dissolve the thermoplastic resin.

Step of Applying Capsule Solution

In the step (S20) of applying the capsule solution, a plurality of extinguishing materials are added to the capsule solution to apply the capsule solution, in which the thermoplastic resin is dissolved, to surfaces of the plurality of extinguishing materials.

Figure 3B:
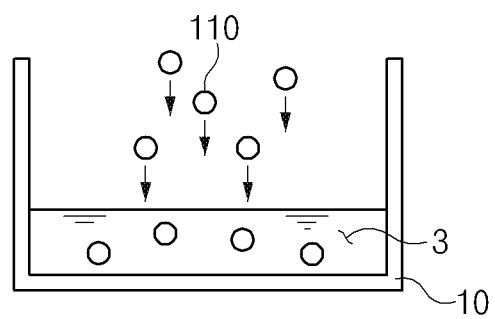

For example, in the step (S20) of applying the capsule solution, as illustrated in FIG. 3b, the plurality of extinguishing materials 110 are added to the capsule solution 3 stored in the water tank 10. Then, while the plurality of extinguishing materials 110 are accommodated in the capsule solution 3, the capsule solution 3 may be naturally applied to outer circumferential surfaces of the plurality of extinguishing materials 110.

Here, each of the extinguishing materials 110 uses calcium bromide (CaBr2).

Step of Stirring Capsule Solution

In the step (S23) of stirring the capsule solution, the capsule solution to which the plurality of extinguishing materials are added is stirred to adjust a size and shape of each of the extinguishing materials and a thickness and shape of the capsule solution applied to the extinguishing materials.

Figure 3C:
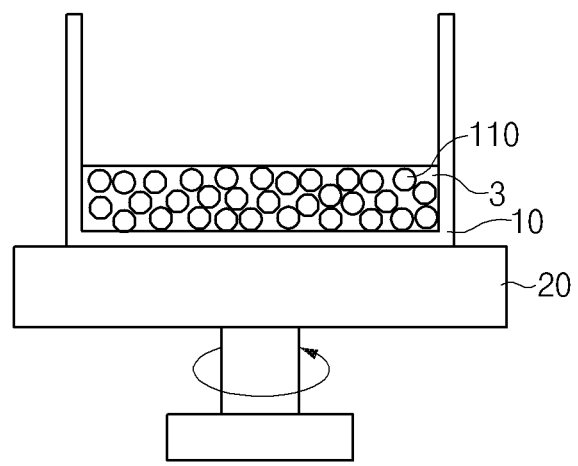

For example, in the step (S23) of stirring the capsule solution, as illustrated in FIG. 3c, the water tank 10 in which the plurality of extinguishing materials and the capsule solution 3 are contained is installed in a stirrer 20, and then, the stirrer 20 operates to allow the water tank 10 to rotate. Here, the stirrer 20 may allow the water tank 10 to rotate forward and reverse every predetermined time to increase in agitation. As a result, the plurality of extinguishing materials 110 stored in the water tank 10 are pulverized into a plurality of materials while colliding with each other or are deformed in a uniform shape. Particularly, the capsule solution 3 is applied again to the outside of the extinguishing materials that are pulverized into the plurality of materials. Also, while allowing the plurality of extinguishing materials 110 to rotate together with the water tank 10, the capsule solution 3 applied to the outside of the extinguishing materials may be formed to have the uniform thickness and shape.

Step of Applying Dispersion Solution

In the step (S25) of applying the dispersion solution, the dispersion solution is applied to the outside of the plurality of extinguishing materials coated with the capsule solution so that the plurality of extinguishing material coated with the capsule solution are separated from each other.

Figure 3D:
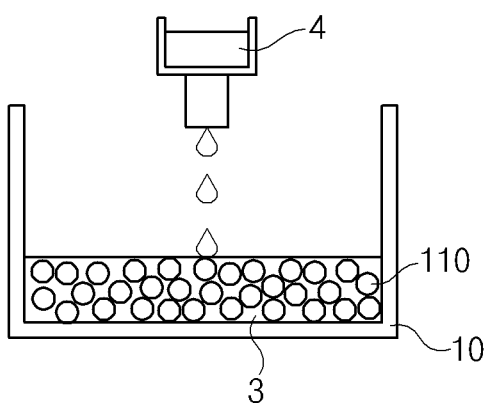

For example, in the step (S25) of applying the dispersion solution, as illustrated in FIG. 3d, the dispersion solution 4 is added to the capsule solution within the water tank 10 in which the stirring is completed in the step (S32) of stirring the capsule solution. As a result, the dispersion solution 4 is mixed with the capsule solution and simultaneously applied to the outer circumferential surfaces of the plurality of extinguishing materials 110. In detail, the dispersion solution 4 is applied to the outside of the capsule solution 3 that is disposed outside the extinguishing materials 110 to allow the outer circumferences of the extinguishing materials 110 to be smooth. Therefore, the plurality of extinguishing materials 110 contained in the capsule solution 3 may be effectively dispersed.

The dispersion solution 4 uses a silicone oil, and the silicone oil may greatly increase in dispersibility of the extinguishing materials.

Step of Completing Extinguishing Composition

In the step (S30) of completing extinguishing composition, the plurality of extinguishing materials coated with the capsule solution are heated to evaporate the solvent contained in the capsule solution. Thus, the thermoplastic resin remaining on the surfaces of the plurality of extinguishing materials may be coagulated to form capsules, thereby preparing the extinguishing solution comprising the capsules containing the extinguishing materials.

Figure 3E:
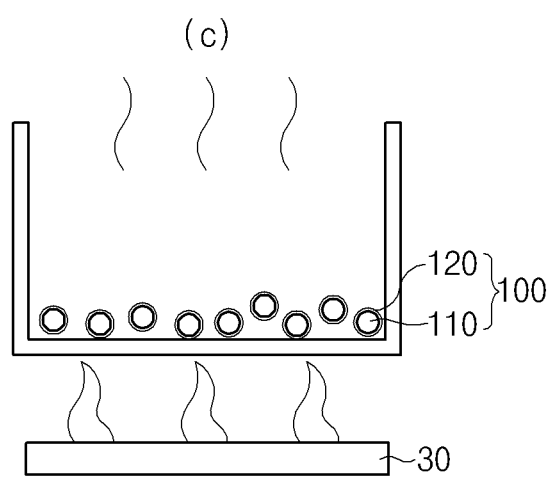

For example, in the step (S30) of completing the extinguishing composition, as illustrated in FIG. 3e, the water tank 1 containing the extinguishing material 110, the capsule solution 3, and the dispersion solution 4 is installed in a heater 30 and then heated by the heater 30. Thus, the extinguishing substance 110, the capsule solution 3 and the dispersion solution 4 stored in the water tank 1 increase in temperature. Here, the solvent 1 contained in the capsule solution 3 is evaporated, and thus, the thermoplastic resin from which the solvent 1 of the capsule solution 3 applied to the extinguishing material 110 is coagulated to form the capsule 120. Also, while moisture contained in the dispersion solution 4 applied to the outer circumferential surface of the capsule 120 is evaporated, a dispersion layer 130 surrounding the capsule 120 is formed.

The extinguishing composition 100 comprising the extinguishing material 110, the capsule 120, and the dispersion layer 130 may be prepared through the above-described processes.

The dispersion layer 130 is configured to disperse the plurality of extinguishing materials 110 without being coagulated when the extinguishing composition 100 is prepared. When the extinguishing composition 100 is completely prepared, the dispersion layer 130 is removed from the extinguishing composition 100. That is, when the dispersion layer 130 is provided in the secondary battery, the dispersion layer 130 may contaminate or deteriorate the electrolyte provided in the secondary battery to cause performance deterioration or failures of the secondary battery.

Thus, when the extinguishing composition is completely prepared, the step of removing the dispersion is performed to remove the dispersion solution.

Step of Removing Dispersion Solution

In the step (S40) of removing the dispersion solution, the extinguishing composition is cleaned to remove the dispersion solution that is the dispersion layer applied to the extinguishing composition.

Figure 3F:
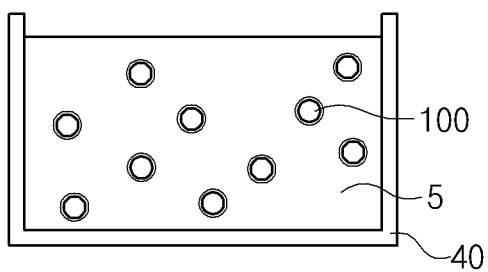

For example, in the step (S40) of removing the dispersion solution, as illustrated in FIG. 3f, the plurality of extinguishing compositions 100 are put into the water tank 40 containing water 5. Then, the dispersion solution that is the dispersion layer applied to each of the extinguishing compositions 100 may be removed by the water 5 stored in the water tank 40 while being cleaned. Alternatively, the dispersion layer applied to the extinguishing compositions may be removed by using flowing water.

As described above, when the step (S40) of removing the dispersion solution is completed, as illustrated in FIG. 1, the finished extinguishing composition 100 comprising the extinguishing material 110 and the capsule 120 may be prepared.

Therefore, the method for preparing the extinguishing composition according to the first embodiment of the present invention may be simply and easily prepared. Particularly, as the calcium bromide (CaBr2) is used as the extinguishing material, an extinguishing agent having a new component may be obtained.

Hereinafter, in descriptions of another embodiment of the present invention, constituents having the same configuration and function as the above-mentioned embodiment have been given the same reference numeral in the drawings, and thus duplicated description will be omitted.

[Secondary Battery According to Second Embodiment of the Present Invention]

Figure 4:
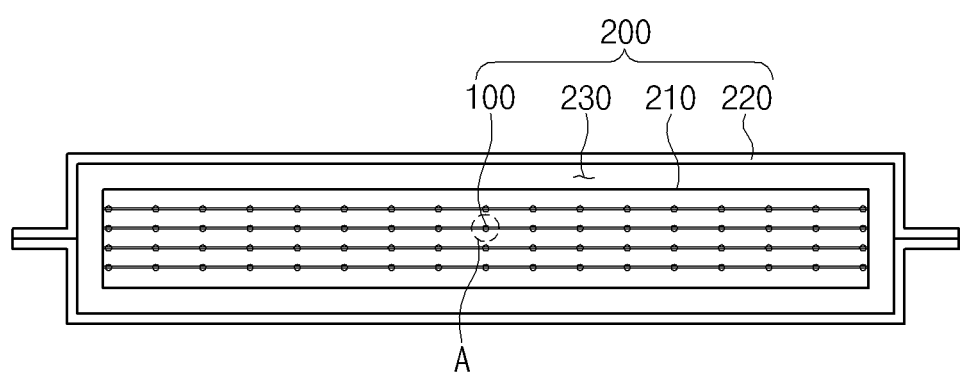
FIG. 4 is a cross-sectional view of a secondary battery according to a second embodiment of the present invention.
Figure 5:
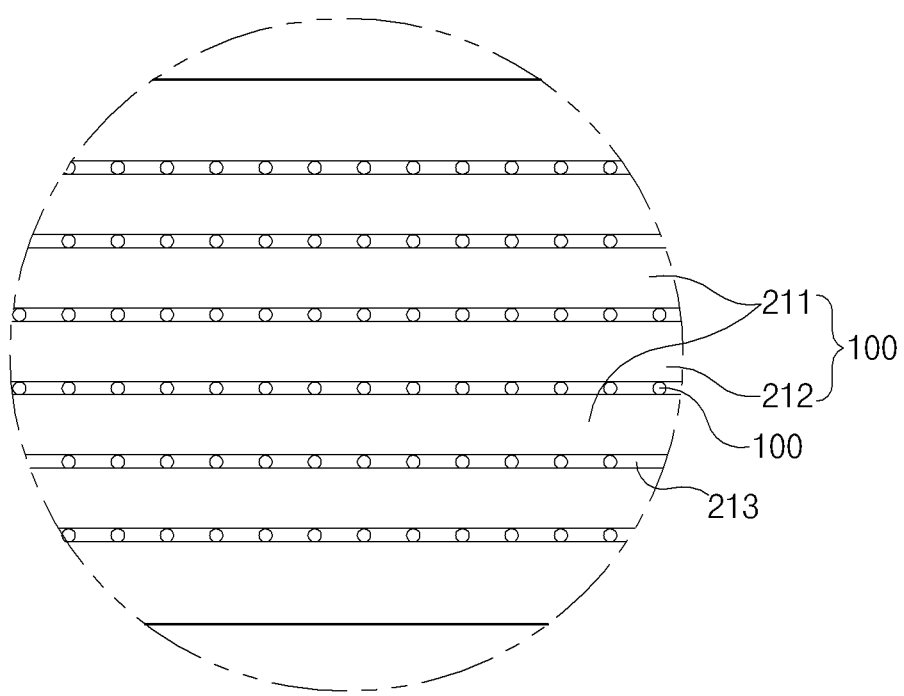
FIG. 5 is an enlarged view of a portion A illustrated in FIG. 4.

As illustrated in FIGS. 4 and 5, a secondary battery 200 according to a second embodiment of the present invention comprises an electrode assembly 210 in which a plurality of electrodes 211 and a plurality of separators 212 are alternately stacked, a case 220 in which the electrode assembly 210 is accommodated, an electrolyte 230 stored in the case 220 so as to be impregnated into the electrode assembly 210, and an extinguishing composition 100 provided in at least one of the electrodes 211, the separators 212, or the electrolyte 230 to suppress high-temperature heat generated in the case 220, thereby preventing explosion or ignition from occurring.

Here, the extinguishing composition 100 comprises an extinguishing material 110 and a capsule 120 containing the extinguishing material 110, and the extinguishing material 110 comprises calcium bromide (CaBr2).

The extinguishing composition 100 has the same component and function as the extinguishing composition according to the foregoing first embodiment, and thus, its duplicated description will be omitted.

Therefore, the secondary battery 200 according to the second embodiment of the present invention comprises the extinguishing composition 100. As a result, when the electrolyte within the case 220 rapidly increases in temperature by the electrode assembly 210, the capsule 120 of the extinguishing composition 100 may be melted to suppress or cool the increases in temperature of the electrolyte 230 through the extinguishing material 110, thereby preventing the secondary battery 200 from being exploded or ignited.

The extinguishing composition 100 may be provided in the separator 212 provided in the electrode assembly 210 to effectively suppress the increase in temperature of the electrodes disposed at both sides of the separator 212.

Particularly, the extinguishing composition 100 may be applied to the surface of the separator 212 through a polymer binder 213 to effectively fix the extinguishing composition 100 to the separator 212.

The extinguishing composition 100 may be further provided on an outer surface of the case 220. That is, the extinguishing composition may be applied to the outer circumferential surface of the case 220 through the binder to form an extinguishing composition layer. Therefore, the secondary battery may be stably protected against the high-temperature heat applied from the outside of the secondary battery, thereby improving the safety of the secondary battery.

[Electrode Pack According to Third Embodiment of the Present Invention]

Figure 6:
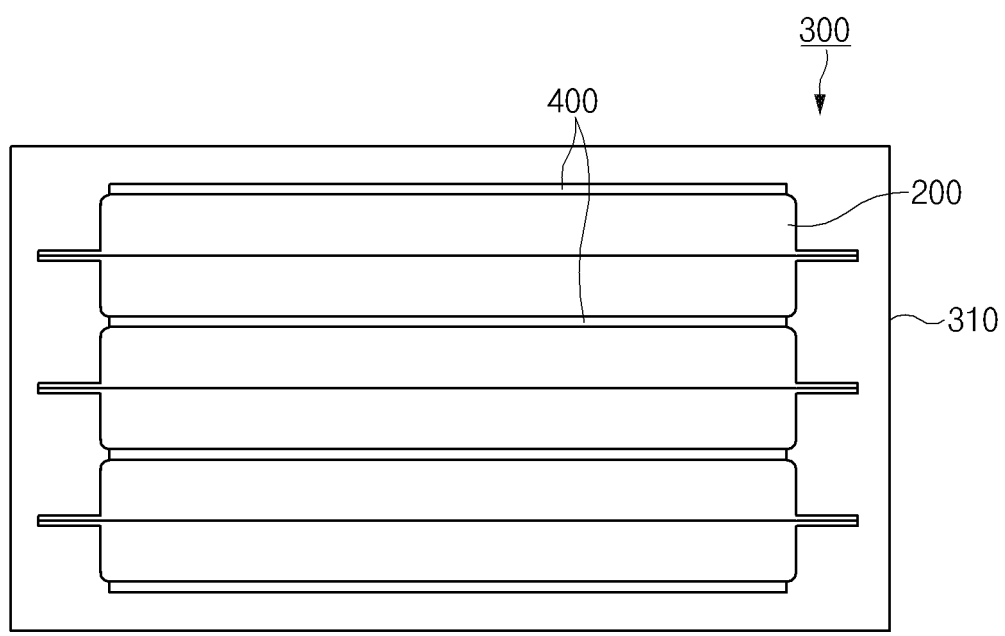
FIG. 6 is a cross-sectional view of a battery pack according to a third embodiment of the present invention.

As illustrated in FIG. 6, a battery pack 300 according to a third embodiment of the present invention comprises one or more secondary batteries 200 and a pack case 310 accommodating the one or more secondary batteries 200. Each of the secondary batteries 200 comprises an electrode assembly 210 in which a plurality of electrodes and a plurality of separators are alternately stacked, a case 220 in which the electrode assembly 210 is accommodated, an electrolyte 230 stored in the case 220 so as to be impregnated into the electrode assembly 210, and an extinguishing composition 100 provided in at least one of the electrodes 211, the separators 212, or the electrolyte 230.

Here, the extinguishing composition 100 comprises an extinguishing material 110 and a capsule 120 containing the extinguishing material 110, and the extinguishing material 110 comprises calcium bromide (CaBr2).

The extinguishing composition 100 has the same component and function as the extinguishing composition according to the foregoing first embodiment, and thus, its duplicated description will be omitted.

Therefore, the battery pack 300 according to the third embodiment of the present invention may comprise the secondary battery 200 provided with the extinguishing composition to effectively suppress or cool the increase in temperature of the secondary battery, thereby improving the safety.

Particularly, in the battery pack 300 according to the third embodiment of the present invention, the secondary battery 200 may comprise the extinguishing composition layer 400 made of the extinguishing material 100 outside the case 220 to effectively suppress the high-temperature heat generated in the pack case 310, thereby preventing the explosion or ignition from occurring.

Experimental Example 1

Experimental Example 1 is performed to confirm a structure of a prepared extinguishing composition.

Preparation Example 1

Figure 7:
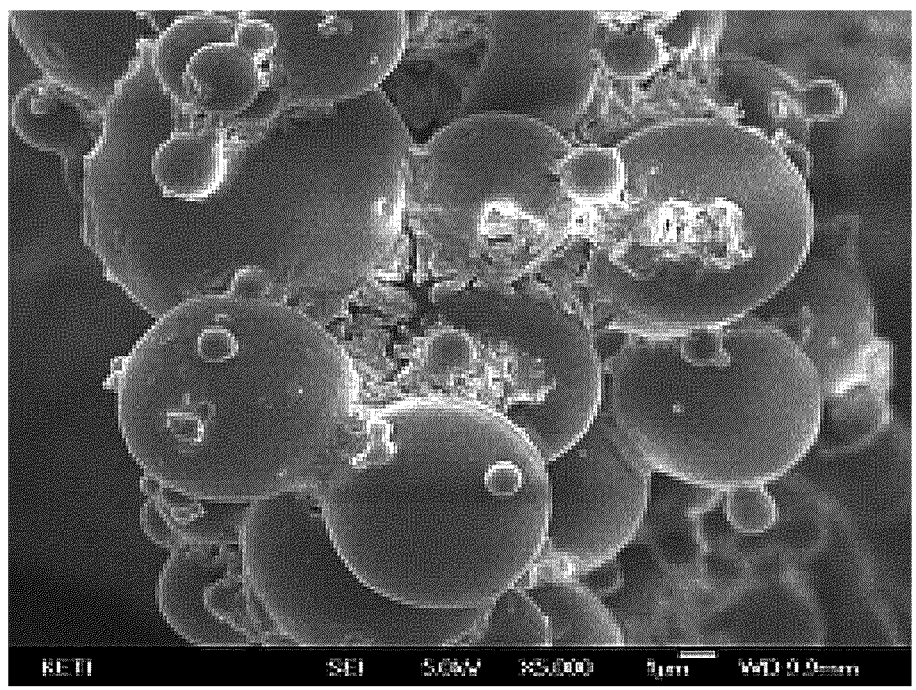
FIG. 7 is an enlarged photograph of an extinguishing composition photographed by Experimental Example 1.

An extinguishing composition prepared by using the method for preparing the extinguishing composition according to the first embodiment of the present invention is prepared, and then, when the prepared extinguishing composition is photographed by using an electron microscope, a photograph as shown in FIG. 7 may be obtained.

That is, referring to FIG. 7, in Preparation Example 1, it may be confirmed that the extinguishing compositions have different sizes. Particularly, it may be confirmed that the extinguishing composition having a globular shape is generated. The photographed extinguishing composition has a size of 1 μm to 100 μm.

Experimental Example 2

Experimental Example 2 is performed to confirm whether the extinguishing composition is applied.

Comparative Example 2

A separator containing no extinguishing composition is prepared, and the prepared separator is photographed by using an electron microscope.

Preparation Example 2

The extinguishing composition is applied to a surface of the separator. Here, the extinguishing composition is applied to the surface of the separator through a polymer binder, and when the coating of the extinguishing composition is completed, it is photographed by using the electron microscope.

Here, in Comparative Example 2 and Preparation Example 2, the separator made of the same material is used, and the same electron microscope is used for the photographing.

Photographing Result

Figure 8A:
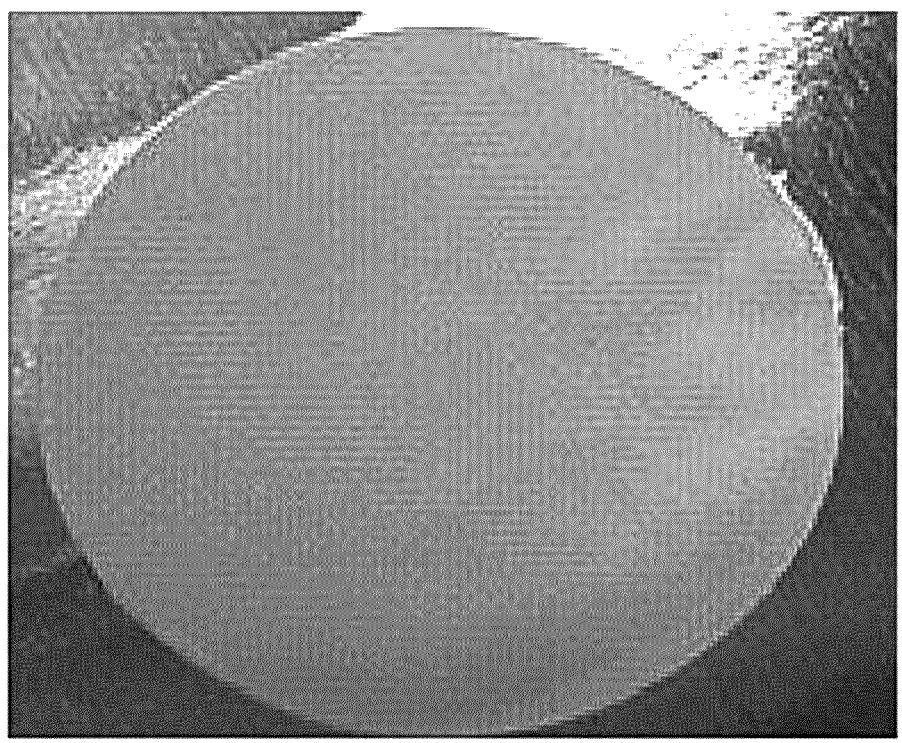
FIGS. 8a and 8b are photographs of separators photographed by Experimental Example 2 according to Comparative Example 2 and Preparation Example 2.
Figure 8B:
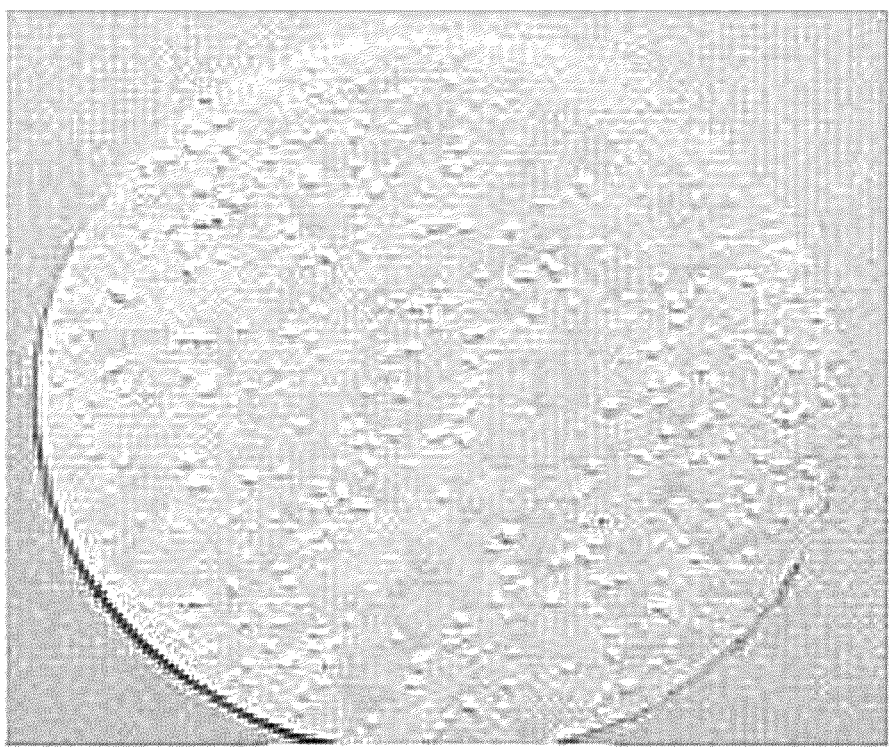

In Comparative Example 2, referring to (a) of FIG. 8, it is seen that nothing is present on the surface of the separator. Also, in Preparation Example 2, referring to (b) of FIG. 8, it may be confirmed that a convex ridge that is expressed by a white color is disposed on an entire surface of the separator. It is confirmed that the ridge is applied to the entire surface of the separator with the extinguishing composition.

Experimental Example 3

Experimental Example 3 is performed to evaluate extinguishing ability of the extinguishing composition.

Comparative Example 3

A solvent in which dimethyl carbonate and ethylene carbonate, which are used as flammable organic electrolytes are mixed with each other is burnt to measure a time required for combustion.

Preparation Example 3

A solvent in which dimethyl carbonate and ethylene carbonate, which are used as flammable organic electrolytes are mixed with each other is burned in a state of containing the extinguishing composition to measure a time required for combustion. Here, in Preparation Example 3, three combustion experiments are carried out. As a result, the obtained results are shown as Preparation Example 3-1, Preparation Example 3-2, and Preparation Example 3-3.

In Comparative Example 3 and Preparation Example 3, the same solvent in which dimethyl carbonate and ethylene carbonate are mixed with each other is used and then burned by using the same firearm.

Combustion Result

Figure 9:
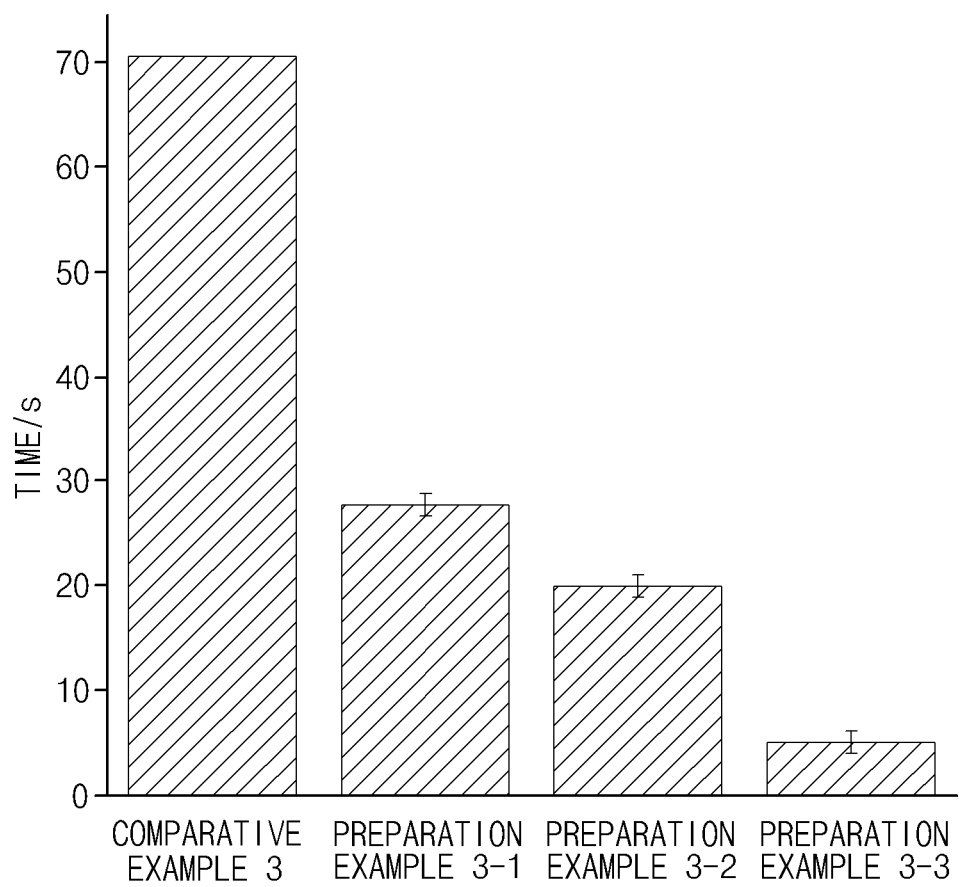
FIG. 9 is a graph illustrating results obtained by evaluating extinguishing ability of the extinguishing composition according to Experimental Example 3.

In Comparative Example 3 and Preparation Example 3, combustion results of FIG. 9 may be obtained through the results obtained by measuring the combustion time.

Referring to FIG. 9, in Comparative Example 3, it may be confirmed that a combustion time of 70 seconds is measured. Also, in Preparation Example 3-1, it may be confirmed that a combustion time of 26 seconds is measured. In Preparation Example 3-2, it may be confirmed that a combustion time of 20 seconds is measured. In Preparation Example 3-3, it may be confirmed that a combustion time of 5 seconds is measured. That is, in Preparation Example 3, it may be confirmed that a combustion time of 5 seconds to 26 seconds is measured.

Thus, according to the results of Experimental Example 3, in Preparation Example 3, in which the extinguishing composition is added, it may be seen that the combustion time is significantly reduced when compared to Comparative Example 3.

Experimental Example 4

Experimental Example 4 is performed to confirms performance impacts of the secondary battery comprising the extinguishing composition (discharge capacity).

Comparative Example 4

A secondary battery comprising an electrode assembly, an electrolyte, and a case is prepared, and a change in performance is measured while charging and discharging the prepared secondary battery.

Preparation Example 4

A secondary battery comprising an electrode assembly, an electrolyte, a case, and an extinguishing composition is prepared, and a change in performance is measured while charging and discharging the prepared secondary battery. Here, in Preparation Example 4, three performance experiments are carried out. As a result, the obtained results are shown as Preparation Example 4-1, Preparation Example 4-2, and Preparation Example 4-3.

In Comparative Example 4 and Preparation Example 4, the secondary batteries have the same constituent except for the extinguishing composition, and the charging and discharging are performed under the same environment and voltage.

Performance Measurement Result

Figure 10:
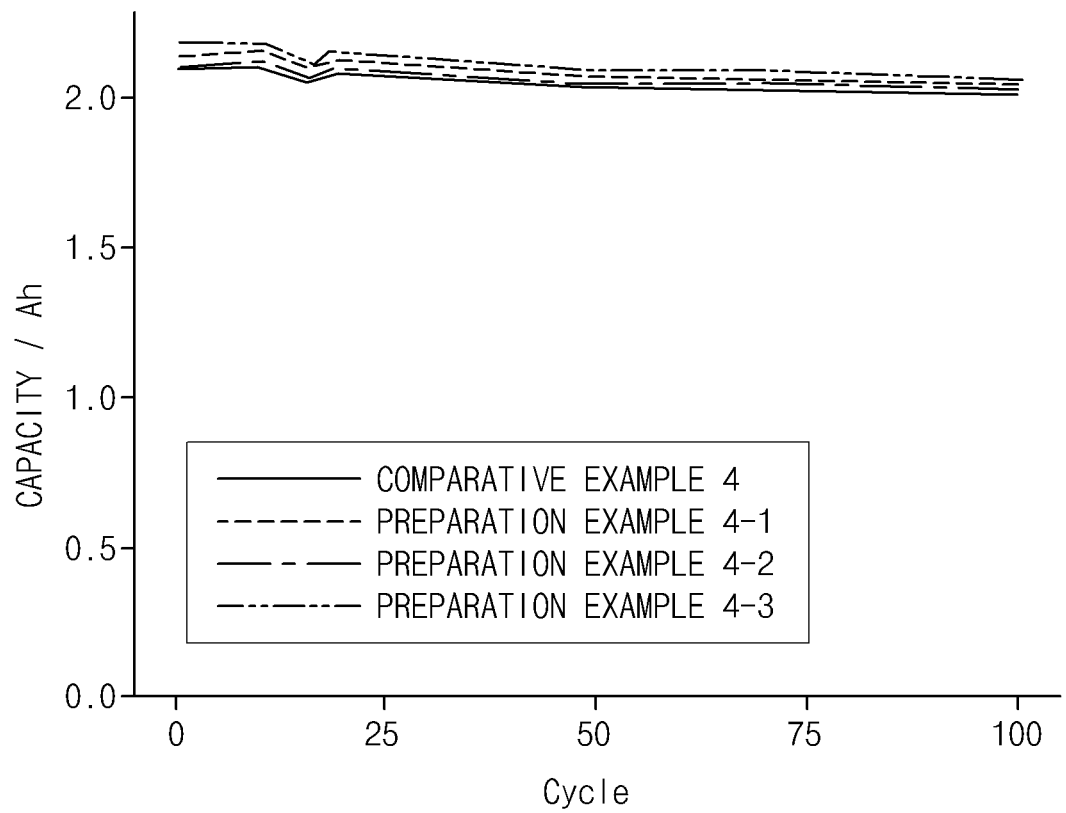
FIG. 10 is a graph illustrating results obtained by measuring performance of a secondary battery containing an extinguishing composition according to Experimental Example 4.

According to the results obtained by measuring the performance in Comparative Example 4 Preparation Example 4, a graph shown in FIG. 10 may be obtained.

Referring to FIG. 10, it may be confirmed that the performance in Comparative Example 4 and Preparation Example 4 have the same cycle. Thus, in Preparation Example 4, even if the extinguishing composition is provided, it may be confirmed that there is no significant difference in performance, that is, discharge capacity.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. An extinguishing composition comprising:
   an extinguishing material;
   a capsule configured to contain the extinguishing material; and
   a dispersion layer applied to an outer circumferential surface of the capsule,
   wherein the dispersion layer is made of a silicone oil material, and
   wherein the extinguishing material comprises calcium bromide.

2. The extinguishing composition of claim 1, wherein the capsule comprises a thermoplastic resin, and
   wherein the thermoplastic resin comprises an acrylate monomer or an acrylate polymer.

3. The extinguishing composition of claim 2, wherein the acrylate polymer comprises a polymethyl methacrylate polymer.

4. The extinguishing composition of claim 1, wherein an inner circumferential surface of the capsule directly contacts the extinguishing material and the outer circumferential surface of the capsule directly contacts the dispersion layer.

5. The extinguishing composition of claim 1, wherein an outer circumferential surface of the dispersion layer forms an outermost layer.

6. A method for preparing an extinguishing composition, the method comprising:
mixing a thermoplastic resin with a solvent to prepare a capsule solution in which the thermoplastic resin is dissolved;
adding a plurality of extinguishing materials to the capsule solution to apply the capsule solution to surfaces of the plurality of extinguishing materials;
heating the plurality of extinguishing materials coated with the capsule solution to evaporate the solvent contained in the capsule solution so as to capsulate the thermoplastic resin remaining on the surfaces of the plurality of extinguishing materials, thereby preparing the extinguishing composition; and
applying a dispersion solution to the outside of the plurality of extinguishing materials coated with the capsule solution so that the plurality of extinguishing materials coated with the capsule solution are separated from each other after stirring the capsule solution and before heating the plurality of extinguishing materials,
wherein the dispersion solution is provided with silicone oil.

7. The method of claim 6, wherein the plurality of extinguishing materials use calcium bromide.

8. The method of claim 6, wherein the thermoplastic resin comprises a polymethyl methacrylate polymer resin that is an acrylate polymer resin, and the solvent comprises dichloromethane.

9. The method of claim 6, further comprising stirring the capsule solution, to which the plurality of extinguishing materials are added, to adjust a size and shape of each of the plurality of extinguishing materials and a thickness and shape of the capsule solution applied to the extinguishing materials after adding a plurality of extinguishing materials to the capsule solution and before heating the plurality of extinguishing materials.

10. The method of claim 6, further comprising, after heating the plurality of extinguishing materials, cleaning the extinguishing composition to remove the dispersion solution applied to the extinguishing composition.

11. A secondary battery comprising:
an electrode assembly in which a plurality of electrodes and a plurality of separators are alternately stacked;
a case in which the electrode assembly is accommodated;
an electrolyte stored in the case so as to be impregnated into the electrode assembly; and
an extinguishing composition provided in at least one of the electrodes, the separators, or the electrolyte,
wherein the extinguishing composition comprises an extinguishing material, a capsule containing the extinguishing material, and a dispersion layer applied to an outer circumferential surface of the capsule,
wherein the dispersion layer is made of a silicone oil material, and
wherein the extinguishing material comprises calcium bromide.

12. The secondary battery of claim 11, wherein, when the extinguishing composition is provided on the separators, the extinguishing composition is applied to surfaces of the separators through a polymer binder.

13. The secondary battery of claim 11, wherein the extinguishing composition is further provided outside the case.

* * * * *